United States Patent
Bruno et al.

(10) Patent No.: US 7,966,313 B2
(45) Date of Patent: Jun. 21, 2011

(54) CONFIGURATION-PARAMETRIC QUERY OPTIMIZATION

(75) Inventors: Nicolas Bruno, Redmond, WA (US); Rimma Nehme, Indianapolis, IN (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 12/146,470

(22) Filed: Jun. 26, 2008

(65) Prior Publication Data

US 2009/0327254 A1 Dec. 31, 2009

(51) Int. Cl.
*G06F 7/00* (2006.01)
*G06F 17/30* (2006.01)
(52) U.S. Cl. ......... 707/713; 707/715; 707/718; 707/775
(58) Field of Classification Search .................. 707/713, 707/715, 716, 718, 721, 765, 769, 775
See application file for complete search history.

(56) References Cited

U.S. PATENT DOCUMENTS

| | | | |
|---|---|---|---|
| 5,960,423 A * | 9/1999 | Chaudhuri et al. | 707/715 |
| 6,266,658 B1 * | 7/2001 | Adya et al. | 1/1 |
| 6,353,826 B1 | 3/2002 | Seputis | |
| 6,618,719 B1 | 9/2003 | Andrei | |
| 7,139,749 B2 | 11/2006 | Bossman et al. | |
| 7,139,778 B2 | 11/2006 | Chaudhuri et al. | |
| 7,155,459 B2 | 12/2006 | Chaudhuri et al. | |
| 7,478,356 B1 * | 1/2009 | Sundararajan et al. | 716/16 |
| 7,493,306 B2 * | 2/2009 | Day et al. | 1/1 |
| 7,685,145 B2 * | 3/2010 | Bruno et al. | 707/999.101 |
| 7,685,194 B2 * | 3/2010 | Kabra et al. | 707/719 |
| 2005/0125427 A1 | 6/2005 | Dageville et al. | |
| 2006/0036989 A1 | 2/2006 | Chaudhuri et al. | |
| 2006/0085484 A1 | 4/2006 | Raizman et al. | |
| 2006/0218118 A1 | 9/2006 | Gupta | |
| 2006/0242102 A1 * | 10/2006 | Bruno et al. | 707/1 |
| 2007/0239744 A1 * | 10/2007 | Bruno et al. | 707/101 |
| 2008/0183644 A1 * | 7/2008 | Bruno et al. | 706/12 |
| 2008/0183764 A1 * | 7/2008 | Bruno et al. | 707/200 |

OTHER PUBLICATIONS

Nicolas Bruno and Rimma V. Nehme disclose(2008), Configuration-Parametric Query Optimization for Physical Design Tuning, pp. 941-952.*
Sarda, et al., "Green Query Optimization: Taming Query Optimization Overheads through Plan Recycling", Proceedings of the 30th VLDB Conference, Toronto, Canada, 2004, pp. 1333-1336.
Stratos Papadomanolakis, "Research Statement—Stratos Papadomanolakis", 2007, pp. 1-4.
Naveen Reddy, "Next Generation Relational Query Optimizers", Jun. 2003, 69 pages.
Agrawal, et al., "Database Tuning Advisor for Microsoft SQL Server 2005", In Proceedings of the 30th International Conference on Very Large Databases (VLDB), Toronto, Canada, 2004, pp. 1110-1121.
Bruno, et al., "Automatic physical database tuning: A relaxation-based approach", In Proceedings of the ACM International Conference on Management of Data (SIGMOD), Baltimore, Maryland, USA, Jun. 14-16, 2005, pp. 227-238.
Bruno, et al., "To tune or not to tune? A Lightweight Physical Design Alerter", In Proceedings of the 32th International Conference on Very Large Databases, Sep. 12-15, 2006, pp. 499-510.

(Continued)

*Primary Examiner* — Don Wong
*Assistant Examiner* — Merilyn P Nguyen

(57) ABSTRACT

Described herein are techniques for Configuration-Parametric Query Optimization (C-PQO) that can improve performance of database tuning tools. When first optimizing a query, a compact representation of the optimization space is generated. The representation can then be used to efficiently produce other execution plans for the query under arbitrary hypothetical configurations.

6 Claims, 11 Drawing Sheets

OTHER PUBLICATIONS

Pedro Celis, "The Query Optimizer in Tandem's new ServerWare SQL Product", In Proceedings of the 22nd International Conference on Very Large Databases (VLDB), Mumbai, India, 1996, p. 592.

Chaudhuri, et al., "An efficient cost-driven index selection tool for Microsoft SQL Server", In Proceedings of the 23rd International Conference on Very Large Databases (VLDB), Athens, Greece, 1997, pp. 146-155.

Chaudhuri, et al., "Autoadmin 'What-if' index analysis utility", In Proceedings of the 1998 ACM International Conference on Management of Data (SIGMOD), vol. 27, Issue 2, Jun. 1998, pp. 367-378.

Dageville, et al., "Automatic SQL Tuning in Oracle 10g", In Proceedings of the 30th International Conference on Very Large Databases (VLDB), Toranto, Canada, 2004, pp. 1098-1109.

Goetz Graefe, "The Cascades framework for query optimization", Data Engineering Bulletin, vol. 18, Issue 3, 1995, pp. 19-28.

Goetz Graefe, "The Microsoft Relational Engine", In Proceedings of the 12th International Conference on Data Engineering (ICDE), 1996, pp. 160-161.

Ioannidis, et al., "Parametric Query Optimization", In Proceedings of the 18th International Conference on Very Large Databases (VLDB), 1992, pp. 1-24.

Papadomanolakis, et al., "Efficient use of the query optimizer for automated physical design", In Proceedings of the International Conference on Very Large Databases (VLDB), Vienna, Austria, Sep. 23-28, 2007, pp. 1093-1104.

Shapiro, et al., "Exploiting upper and lower bounds in top-down query optimization", In Proceedings of the 2001 International Symposium on Database Engineering & Applications (IDEAS), 2001, pp. 20-33.

Valentin, et al., "DB2 advisor: An optimizer smart enough to recommend its own indexes", In Proceedings of the 16th International Conference on Data Engineering (ICDE), San Diego, CA, USA, 2000, pp. 101-110.

Zilio, et al., "DB2 design advisor: Integrated automatic physical database design", In Proceedings of the 30th International Conference on Very Large Databases (VLDB)—vol. 30, Toronto, Canada, 2004, pp. 1087-1097.

\* cited by examiner

200

OptimizeGroup (group G, properties RP, double UB)
returns *groupExpression*
01  $p = winnerCircle[G, RP]$
02  if ( $p$ is not NULL )
        if ($p.cost < UB$) return $p$
        else return NULL
03  $bestP$ = NULL  // No precomputed solution, enumerate plans
04  for each enumerated physical *groupExpression candP*
05      $candP.cost = localCost(candP)$
06      for each input $p_i$ of $candP$
07          if ($candP.cost \geq UB$) go back to 4  // out of bound
08          $G_i$ = group of $p_i$
            $RP_i$ = required properties for $p_i$
09          $bestP_i$ = OptimizeGroup($G_i, RP_i, UB - candP.cost$)
10          if ($bestP_i$ = NULL) break  // no solution
11          $candP.bestChild[i] = bestP_i$
12          $candP.cost$ += $bestP_i.cost$
        // Have valid solution, update state
13      if ($candP.cost < UB$)
            $bestP = candP$
            $UB = candP.cost$
14  $winnerCircle[G, RP] = bestP$
15  return $bestP$

```
OptimizeGroup_{C-PQO} (Group G, Properties RP)
returns Set of groupExpression
01  allP = alternativePool[G, RP]
02  if (allP is not NULL) return allP
// No precomputed solution, enumerate plans
03  candPool = ∅
    UB = ∞
04  for each enumerated physical groupExpression candP
05      candP.bestCost = localCostForBest(candP)
        candP.worstCost = localCostForWorst(candP)
06      for each input p_i of candP
07          if (candP.bestCost ≥ UB)
                continue back to 3  // out of bounds
08          G_i = group of p_i
            RP_i = required properties for p_i
09          allP_i = OptimizeGroup_{C-PQO}(G_i, RP_i)
10          if (allP_i = ∅) break  // no solution
11          candP.allChildren[i] = allP_i
12          candP.bestCost += min_{c_i ∈ allP_i} c_i.bestCost
            candP.worstCost += min_{c_i ∈ allP_i} c_i.worstCost
        // Have valid solution, update state
13      candPool = candPool ∪ {candP}
14      if (candP.worstCost < UB)
            UB = candP.worstCost
15  alternativePool[G, RP] = candPool
16  return candPool
```

FIG. 8

CONFIGURATION-PARAMETRIC QUERY OPTIMIZATION

BACKGROUND

It is known in the field of databases that queries are optimized to execute efficiently. FIG. 1 shows a database management system (DBMS) 100. The DBMS 100 receives a query 102, and a query optimizer 104 outputs a query execution plan 106 that an execution engine 108 executes to perform the query 102. The optimizer 104 typically builds a query tree and optimizes the query tree while translating it into a tree of instructions (an execution plan) that are executable by the execution engine 108. How the optimizer 104 constructs the execution plan can depend on many factors, such as the query, the shape of the data in the database, sizes of the tables, data skew, the structure of the indexes, and so on. The optimizer 104 considers these factors, analyzes many possible plans, and picks the optimal one. While effective, runtime query optimization is limited to the current configuration of the database. That is, queries can execute only as quickly as design (e.g., indexes) of the database permits.

Another way to get queries to execute efficiently is to physically tune a database. That is to say, a database administrator (DBA) might physically tune a database by reconfiguring indexes, adding indexes, adding memory, and making other systemic physical changes that facilitate efficient execution of queries expected to be received by the DBMS.

To this end, physical design tuning tools have been used. FIG. 2 shows a physical design tuning tool 130. The tuning tool 130 is an application used by a DBA to explore alternate configurations of the database 102. Different storage boundaries 132 (e.g., memory limits) and physical configurations and workloads 134 (sets of queries) can be tested for performance results. The tuning tool 130 may function as a database client that communicates with the DBMS 102 through an interface (an API provided by the database) to submit "what-if" scenarios that the DBMS explores, tests, and provides feedback on without necessarily executing the queries. In other words, the DBMS 102 can give feedback on how well a query optimizes or performs according to a possible configuration. As a result, the tuning tool 130 may output some configuration 136 (e.g., some set of indexes $I_1 \ldots I_m$) deemed to be ideal for the given boundaries 132 and workload 134. Generally, the tuning tool 130 may test many configurations for a query before deciding which configuration is optimal.

While physical design tuning is beneficial for improving database performance, it sometimes becomes expensive due to many what-if optimization calls. A tuning tool may examine many configurations, and in doing so perform many what-if calls to a database, possibly becoming a bottleneck for the tuning tool. Therefore, there is room to improve the actual performance of tuning tools that explore hypothetical configurations of a database.

SUMMARY

The following summary is included only to introduce some concepts discussed in the Detailed Description below. This summary is not comprehensive and is not intended to delineate the scope of the claimed subject matter, which is set forth by the claims presented at the end.

Described herein are techniques for Configuration-Parametric Query Optimization (C-PQO) that can improve performance of database tuning tools. When first optimizing a query, a compact representation of the optimization space is generated. The representation can then be used to efficiently produce other execution plans for the query under arbitrary hypothetical configurations.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 5 shows pseudocode for an OptimizeGroup task.

FIG. 8 shows pseudocode of an OptimizeGroup$_{C-PQO}$ procedure.

DETAILED DESCRIPTION

Overview

Figure 1:
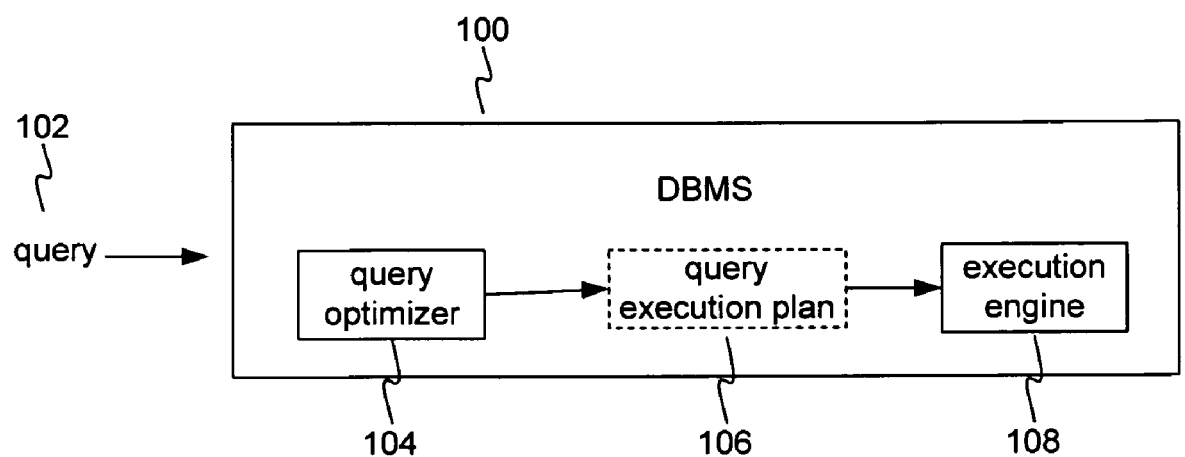
FIG. 1 shows a database management system (DBMS).
Figure 2:
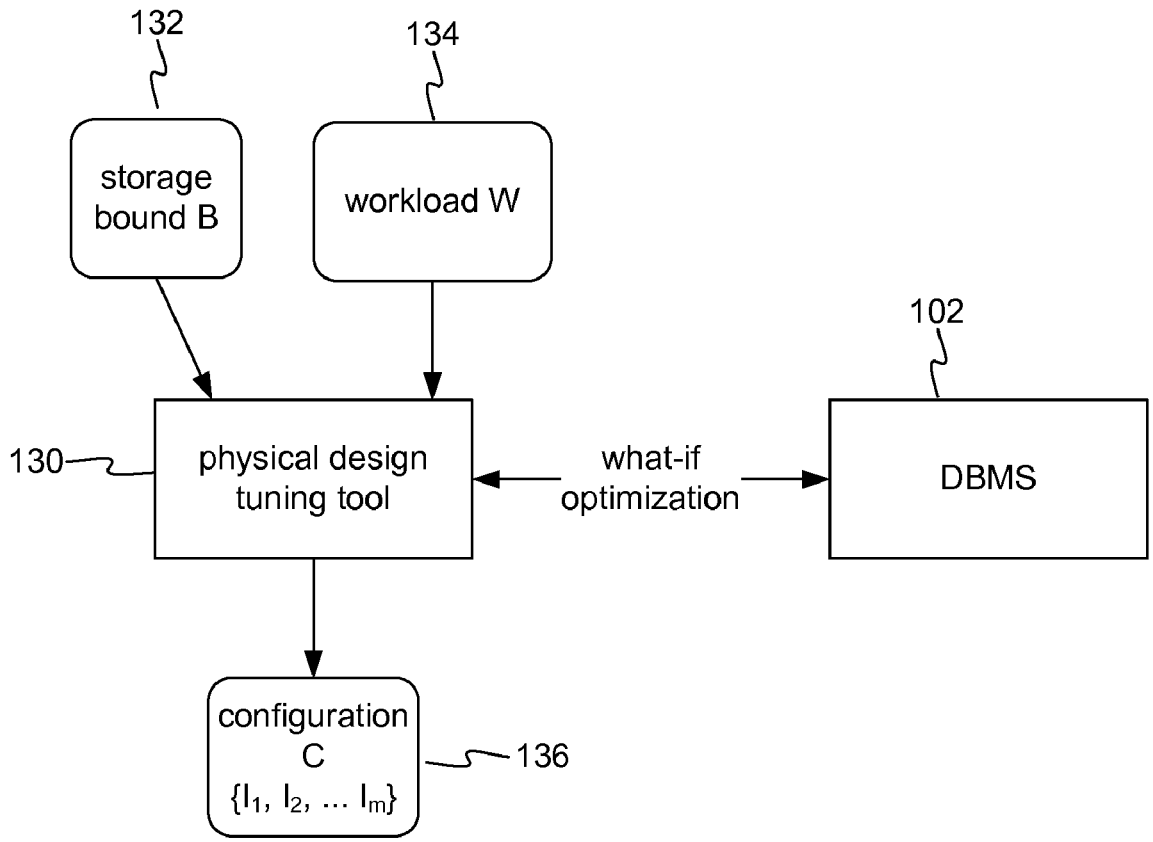
FIG. 2 shows a physical design tuning tool.

As noted in the Background, databases optimize queries. However, if a database is physically reconfigured, for example by adding a new index, the execution plan for a same query can change. Even a small change in a database's physical configuration can make it difficult to reuse a query plan for a same query. Consequently, when a physical design tuning tool or other application tests a query, the query has been fully optimized under the assumption that even a small change in configuration can greatly alter the optimal execution plan for the query.

Suppose that a tuning tool has a workload of say 20 queries and it wishes to test 500 different possible database configurations for each query, then perhaps 10,000 queries must be optimized by the DBMS. If one particular query is considered, even though the query may be tested for each of the 500 possible configurations, much of the optimizing for the query might be independent of the configuration. For example, 85% of the optimizing of the query might be the same for each of the 500 different configurations. Consequently, in theory, 85% of the DBMS's optimizing for that query is repeated for each of its 500 test runs. In other words, for a hypothetical query, much of the optimizing by the DBMS may be independent of the hypothetical configuration and therefore is repeated each time the query is optimized.

Furthermore, the configurations under which a query is tested (optimized) may differ only slightly from one configuration to the next, so that even some of the configuration-sensitive optimizing of the query might be repeated between successive tests. For example, if a query is tested according to 10 indexes and two configurations differ by only one index, then much of the optimizing might be the same for both configurations.

Embodiments discussed below aim to improve optimization of what-if queries (queries optimized but not executed) by reducing or eliminating this redundant optimization performed by the DBMS. As discussed below, this may be accomplished by careful modifications of a DBMS's optimization framework and the testing API (the what-if API) with which a client accesses it.

The following description will begin with an explanation of an example query optimization framework. A memo data structure of the framework will be explained. Various optimization tasks performed by an optimizer will be described. Then it will be explained how to modify the framework to compactly represent an optimization of a query for arbitrary configurations.

Optimization Framework

The idea of an optimization framework may be understood by describing an actual optimization framework, namely, the Cascades Optimization Framework, or "Cascades". Consider the following high level overview of the framework followed by detailed description of certain relevant components.

The Cascades optimization framework is the foundation for various commercial databases such as Tandem's NonStop SQL, Microsoft's SQL Server, and various academic query optimizers. Cascades-based optimizers are top-down transformational optimizers that produce efficient execution plans for inputted queries. These optimizers manipulate operators which are the basic components of operator trees and are used to describe both the inputted query and the outputted execution plan. An example will help understand.

Figure 3:
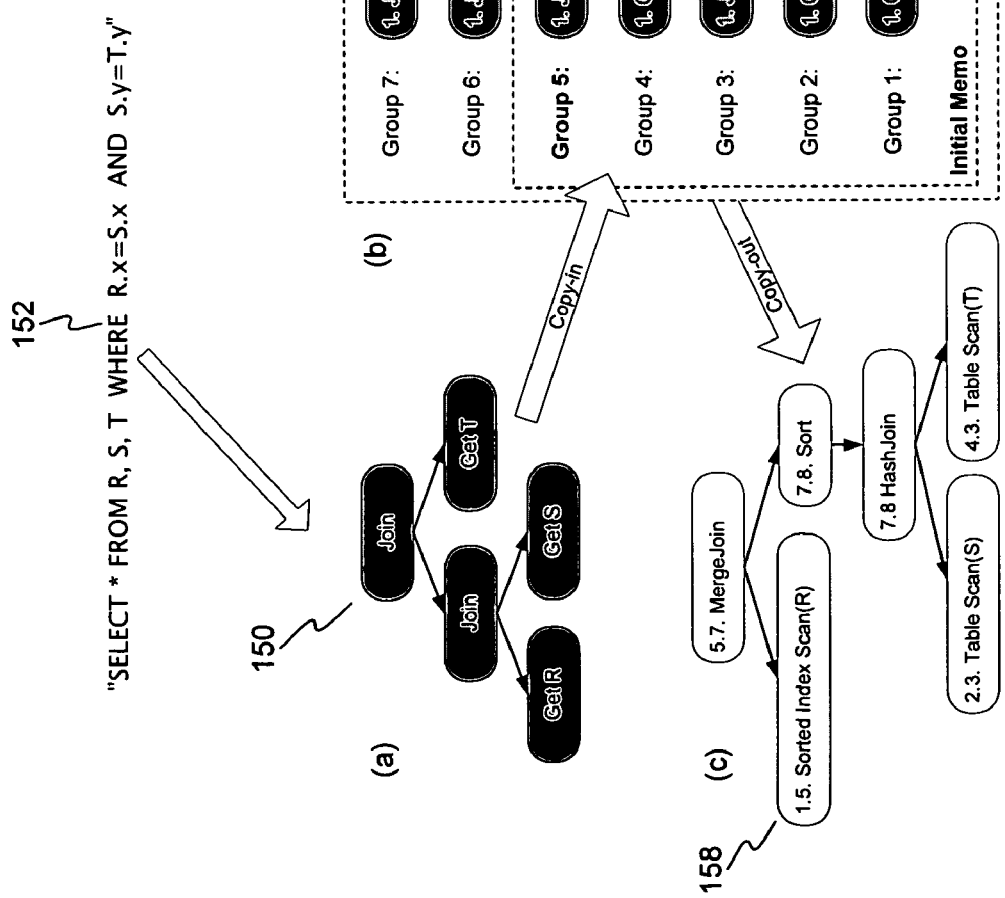
FIG. 3 shows a tree of logical and physical operators that specify the relational algebra representation of a query as well as execution plans to evaluate it.

Consider the simple SQL query: "SELECT*FROM R, S, T WHERE R.x=S.x AND S.y=T.y". FIG. 3 shows an initial tree of logical and physical operators 150 (generated by a DBMS optimizer) that specify, in an almost one-to-one correspondence, the relational algebra representation of the query 152 above. A tree of physical and logical operators that corresponds to an efficient execution plan for the above query is also shown. The tree is structured by the linking numbers in the nodes, where a link number is the group followed by the node. For example, node 154 has link number 5.7, as it is the node number 7 in group 5. In one arrangement, node 154 is a leaf of parent node 156 (node "7.8"). A query optimizer transforms the original operator tree 150 into an efficient physical operator tree 158 (one that can be executed by the database's query engine). For that transformation, Cascades-based optimizers use two components: a MEMO data structure which keeps track of the explored search space, and optimization tasks, which guide the search strategy (i.e., the search for an optimal execution plan). The tree of physical and logical operators is a partial example of a MEMO 160. Because advances described herein can be implemented by extensions and modifications to the MEMO data structure, the MEMO will be described in detail next. Optimization tasks will be described later.

The Memo Data Structure

The MEMO data structure in Cascades (or equivalents) compactly represents the search space of possible execution plans. In addition to enabling memorization (a variant of dynamic programming), a MEMO provides duplicate detection of operator trees, cost management, and other supporting infrastructure needed during query optimization. A MEMO consists of two mutually recursive data structures, called groups and groupExpressions. A group represents all equivalent operator trees producing the same output. To reduce memory requirements, a group does not explicitly enumerate all of its operator trees. Instead, it implicitly represents all the operator trees by using groupExpressions. A groupExpression is an operator having other groups (rather than other specific operators) as children. Consider the example MEMO 160 shown in FIG. 3.

Referring again to FIG. 3, MEMO 160 is for the query 152. MEMO 160's logical operators are shaded and its physical operators are not. In MEMO 160, "Group 1" represents all equivalent expressions that return the contents of table R. Some operators in group 1 are logical (e.g., "Get R"), and some are physical (e.g., "Table Scan", which reads the contents of R from the primary index or heap). Group 3 contains all the equivalent expressions for R⊳⊲S. Note that groupExpression 3.1 ("Join(1,2)") represents all operator trees whose root is Join, whose first child belongs to group 1, and whose second child belongs to group 2. In this way, a MEMO compactly represents a potentially large number of operator trees. Note that the children of physical groupExpressions also point to the most efficient groupExpression in the corresponding groups. For instance, groupExpression 3.8 ("HJ(1.2, 2.2)") represents a hash join operator whose left-hand-child is the second groupExpression in group 1 and whose right-hand-child is the second groupExpression in group 2.

In addition to representing operator trees, the MEMO provides infrastructure for management of properties (not shown in FIG. 3). There are two kinds of properties; logical and physical. Logical properties are shared by all groupExpressions in a group and are therefore associated with the group itself. Examples of logical properties are the cardinality of a group, the tables over which the group operates, and the columns that are output by the group. Physical properties are specific to physical groupExpressions and typically vary within a group. Examples of physical properties are the order of tuples in the result of a physical groupExpression, and the cost of the best execution plan rooted at a given groupExpression. Other features of MEMO data structures will be discussed below as necessary.

Optimization Tasks

Figure 4:
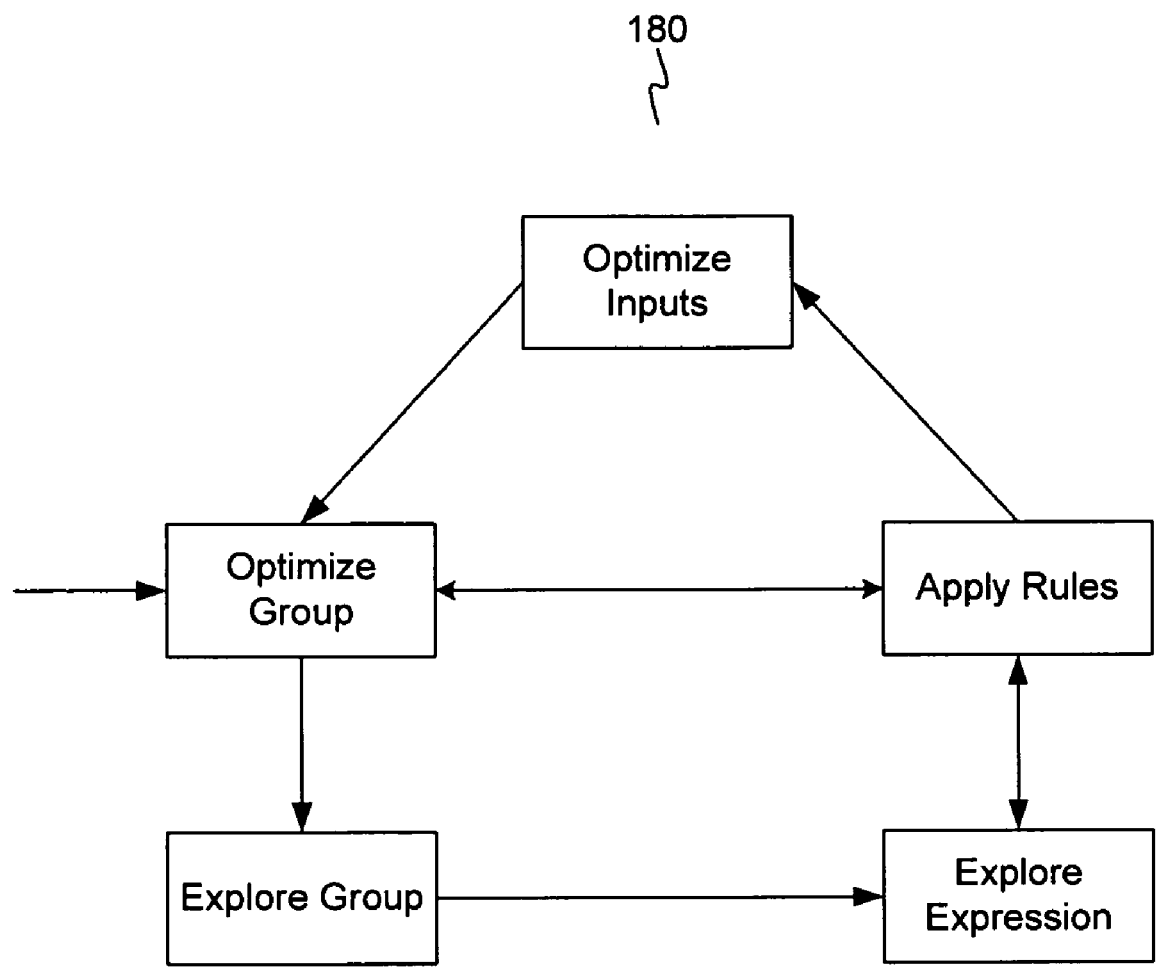
FIG. 4 shows the interactions between five classes of tasks in a typical Cascades-based optimizer.

FIG. 4 shows the interactions between five classes of optimization tasks in a typical Cascades-based optimizer 180. Optimization in Cascades is performed by several different tasks that mutually depend on each other. Optimization of a query begins by copying the logical operator tree (describing the input query) into the initial MEMO (e.g., MEMO 160). The optimizer then schedules the optimization of the group corresponding to the root of the original query tree (group 5 in MEMO 160). This triggers the optimization of smaller and smaller operator sub-trees and eventually returns the most efficient execution plan for the input query. This execution plan is copied out from the final MEMO and passed to the execution engine. The individual tasks in FIG. 4 are described next.

OptimizeGroup: This task takes as inputs a group G, a cost bound UB, and a set of required physical properties RP. OptimizeGroup returns the most efficient execution plan that implements group G, that costs no more than UB, and that satisfies the required properties RP. This task implements memorization by caching the best execution plan for a given set of required properties in a winner circle. Subsequent calls to OptimizeGroup with the same required physical properties would return immediately with the best plan or a failure (depending on the value of UB). Operationally, optimizing a group entails exploring the group (see the ExploreGroup task) and then applying all implementation rules (see the ApplyRule task) to produce all the candidate physical operators that implement the logical counterparts in the group.

ExploreGroup: This task explores a group by iteratively exploring each logical groupExpression in the group (see ExploreExpr task).

ExploreExpr: This task explores a logical groupExpression and generates all logically equivalent alternatives of the input groupExpression by applying exploration rules (see the ApplyRule task). This task also uses memorization to avoid repeated work. Consider a "join-commutativity" rule that transforms groupExpression G1 into G2. When exploring G2 after exploring G1, it would not make sense to apply "join-commutativity" again because G1 would be the result. ExploreExpr uses a bitmap, called pattern memory, that keeps track of which transformation rules are valid and which ones should not be applied.

ApplyRule: This task applies rules of a rule set (discussed in a later section). In general, each rule is a pair of an antecedent (to match in the MEMO) and a consequent (to generate and introduce back into the MEMO). An example is the join-associatively rule: "JOIN($g_1$,JOIN($g_2$, $g_3$))→JOIN(JOIN($g_1$, $g_2$), $g_3$)". The ApplyRule task can be broken down into four steps. First, all the bindings for a rule's antecedent are identified and iterated over one by one (for complex rules, there can be different ways of matching the antecedent of the rule with operator trees in the current group). Second, the rule is applied to each binding that generates one or more new expressions (for the rule above, there is a single substitute per rule application, but in general there might be more than one). Third, the resulting expressions are integrated back into the MEMO, possibly creating new, unexplored groups (as an example, applying the join-associativity rule to expression 5.1 (item 1 in group 5) in MEMO 160 results in groupExpression 5.2, which points to a newly created group 7). Finally, each new groupExpression triggers follow-up tasks, which depends on the root of the new groupExpression. If the root is a logical operator, the optimizer was exploring the group and thus an ExploreExpr task is scheduled for the new groupExpression. Otherwise, the expression inputs are optimized and the cost of the physical plan is calculated (see the OptInputs task).

OptInputs: This task optimizes the inputs of a given physical operator p and computes the best execution plan rooted at p. For each input $p_i$, OptInputs first calculates the required properties of $p_i$ with respect to p and then schedules an OptimizeGroup task for the group of $p_i$. As an example, suppose that the root of the tree is a MergeJoin operator. Since MergeJoin expects the inputs in a specific order, the current task generates a required sort property for each of the inputs and optimizes the corresponding groups under this new optimization context. The OptInputs task also implements a cost-based pruning strategy. More specifically, whenever it detects that the lower bound of the expression that is being optimized is larger than the cost of an existing solution, it fails and returns no plan for that optimization goal.

As can be seen, the five optimization tasks outlined above are non-trivial and depend on each other. For clarity, presented next is a conceptually simplified version of the OptimizeGroup task that incorporates the portions of the remaining tasks that are relevant for this work.

FIG. 5 shows pseudocode 200 for the OptimizeGroup task. The pseudocode takes as inputs a group G, required properties RP, and a cost upper-bound UB. OptimizeGroup(G, RP, UB) returns the most efficient physical groupExpression that satisfies RP and is under UB in cost (otherwise, it returns NULL). Initially, line 01 checks the winner circle (implemented as an associative array) for a previous call compatible with RP. If it finds one, it returns either the best plan found earlier (if its cost is below UB), otherwise it returns NULL. If no previous task is reusable, line 04 iterates over all enumerated physical groupExpressions in G (note that, strictly speaking, line 04 encapsulates ExploreGroup, ExploreExpr, and ApplyRule). For each such root groupExpression p, line 05 estimates the local cost of candP (i.e., without counting its inputs). Then, line 08 calculates the input group and required properties for each of candP's inputs and line 09 recursively calls OptimizeGroup to optimize them (note that the upper bound in the recursive call is decreased to UB−candP.cost).

After each input is successfully optimized, lines 11 and 12 store the best implementation for each of candP's children and update its partial cost. Note that, if at any moment the current cost of candP becomes larger than UB, the candidate is discarded and the next one is considered (line 07). Otherwise, after candP is completely optimized, line 13 checks whether candP is the best plan found so far. Finally, after all candidates are processed, line 14 adds the best plan to the winner circle for G and RP, and line 15 returns such plan.

The Rule Set

The rule set used by a typical Cascades-based optimizer is discussed next because some rules produce database access path alternatives. As such, these rules, discussed in this section, can be relevant to query optimization under different physical configurations when tuning a database.

Most Cascades-based optimizers use a rule set with two main types of rules. Exploration rules transform logical operator trees into equivalent logical operator trees, and can range from simple rules like join commutativity to more complex ones like pushing aggregates below joins. Implementation rules transform logical operator trees into hybrid logical/physical trees by introducing physical operators into the MEMO. Implementation rules can range from simple rules for transforming a logical join into a physical hash join, to more complex rules. This section provides additional details on a small subset of implementation rules that produce access path alternatives.

One such rule transforms a logical expression consisting of a selection over a single table into a physical plan that exploits the available indexes (candidate plans include index scans, rid intersections and lookups among others). After binding the logical operator tree, this rule identifies the columns that occur in sargable predicates, the columns that are part of a required sort property, and the columns that are additionally referenced in non-sargable predicates or upwards in the query tree. Then the rule analyzes the available indexes and returns one or more candidate physical plans for the input sub-query.

Consider the application of such a rule for a groupExpression that represents $\Pi_c(\sigma_{a=10}(R))$, and further suppose that column b is a required sort order. In this case, the rule identifies column a in a sargable predicate, column b as a required order, and column c as an additional column that is either output or referenced upwards in the tree. This information allows the optimizer to identify the available indexes that might be helpful to implement an efficient sub-plan for the sub-query. Suppose that an index on column a is available. The optimizer can then generate a physical operator tree that uses the index to retrieve all tuples satisfying a=10, fetches the remaining columns from a primary index, and finally sorts the resulting tuples in b order. If an index on columns (b, a, c) is also available, the optimizer might additionally generate an operator tree that scans the index in b order and filters on the fly the tuples that satisfy a=10. Depending on the selectivity of a=10, one alternative would be more efficient than the other, and eventually the optimizer would pick the one that results in the smallest execution cost.

Note that the same mechanism is used in another important rule that transforms logical joins with single-table right-handsides into index-nested-loops execution plans (which repeatedly access an index on the right-hand-side's table for each tuple produced by the left-hand-side input). In this case, the same procedure is conducted with respect to the inner table only, and the joined column in the table is considered as part of a sargable (equality) predicate. For instance, suppose that the logical sub-plan is $(Q \triangleright \triangleleft_{Q.x\ T.y} T)$, where Q represents an arbitrary complex expression. Conceptually, the rule produces an index-nested-loop plan and considers the right-hand-side as a single-table-selection $\sigma_{T.y=?}(T)$ as before (where T.y is a column in a sargable predicate with an unspecified constant value).

C-Parametric Query Optimization

As explained in the previous section, among the large set of possible rules in a Cascades-based optimizer there is a small subset that deals with access path selection (a path or order of accessing indexes, for example). These rules might make a difference when optimizing the same query under different configurations.

Figure 6:
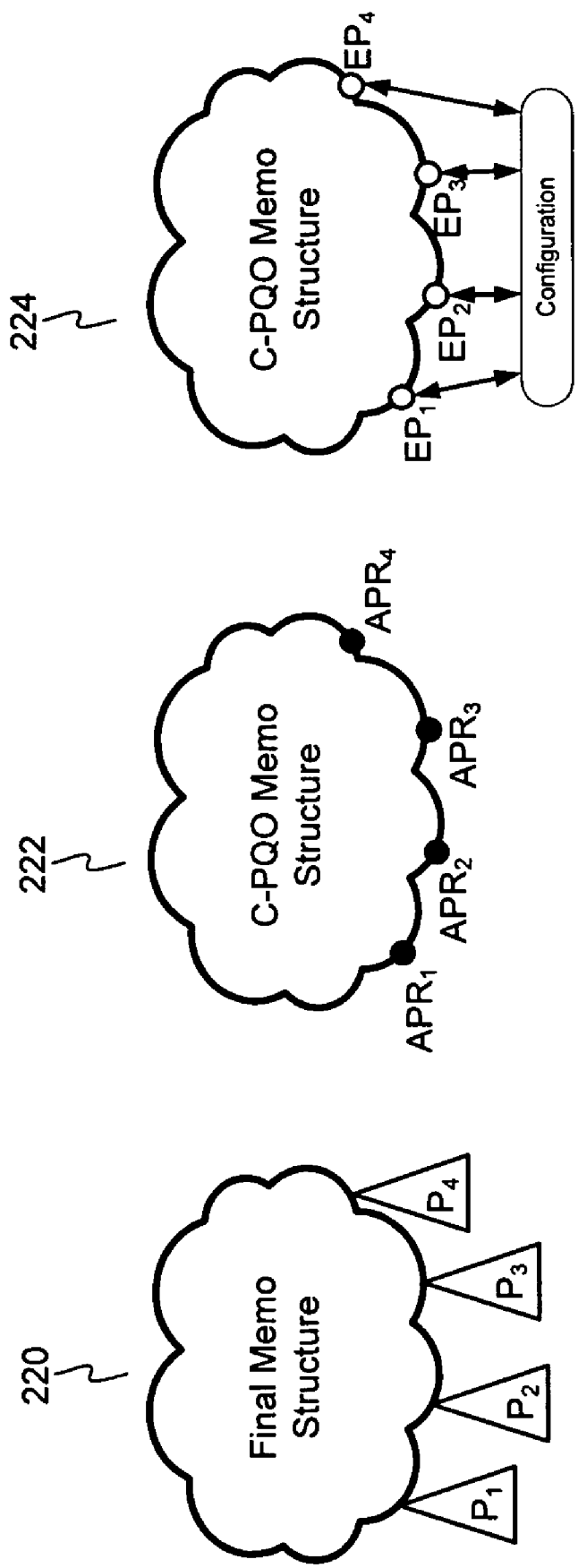
FIG. 6 shows a high level conceptual view for C-Parametric Query Optimization (C-PQO).

FIG. 6 shows a high level conceptual view for C-Parametric Query Optimization (C-PQO). Consider final MEMO structure 220 after optimizing an input query q. If only a physical groupExpression is considered, this final MEMO is a directed acyclic graph, where each node is a groupExpression and edges going out of a node G connect G with its best children groupExpressions. Now identify the nodes in the MEMO that were a result of applying some rule that deals with access path selection (these subgraphs are marked as $P_1, \ldots, P_4$ in the final MEMO structure 220 of FIG. 6). Then, everything that is above the $P_i$ sub-graphs is independent of the configuration.

The final MEMO structure 220 can be modified by replacing each $P_i$ with a concise description of the logical operator tree that produced such physical execution plan (such descriptions are denoted as $APR_i$ in the C-PQO MEMO structure 222 and are formally defined in the next section; "Intercepting Access-Path Selection Rules"). Whenever the query is desired to be re-optimized under a different configuration it is possible to primarily focus on the $APR_i$ descriptions and infer small execution plans that satisfy their requirements under the new configuration (denoted $EP_i$ in C-PQO MEMO structure 224). The best execution plan can then be extracted from the resulting MEMO (whose bulk was pre-computed) in a much more efficient manner.

Although the conceptual idea of C-PQO is not complex, there are significant challenges in implementation. First, it will be helpful to have a simple and accurate description of the properties of each physical operator tree $P_i$ that is efficient to generate (see the section titled "Intercepting Access-Path Selection Rules"). Second, the final MEMO should consider execution plans that can be generated by arbitrary configurations. To better understand this point, consider the rule that implements index-nested loop joins for logical joins with single-table right hand sides, which were described in the "Rule Set" section above. If at optimization time there is no index on the right-hand-side table, the optimizer would not even generate an execution plan $P_i$ and this alternative could be missed when later optimizing under a configuration that contains such index. Third, as described in FIG. 5, optimizers implement branch-and-bound techniques to prune the search space. Preferably, however, alternatives are not eliminated from consideration unless there is no possible configuration that might result in the alternative being useful (see the "Relaxing the Search Space" section). Finally, current optimizers only keep the most efficient groupExpression for every child group of a given groupExpression. In the context of C-PQO, there is not a single "most efficient" groupExpression, since this would depend on the underlying configuration. Thus, it should be possible to track all possible alternatives that might become part of the final execution plan (see the section titles "Putting It All Together"). The remainder of this section ("C-PARAMETRIC QUERY OPTIMIZATION") explores these challenges.

Intercepting Access-Path Selection Rules

To isolate the variable portion of the optimization process with respect to varying configurations, the optimizer is instrumented as follows. A new physical operator is created, which is called APR (for access path request). The process of generating substitutes of all the rules that are related to access path selection (see "The Rule Set" section) is modified so that they always return an APR singleton operator tree rather than an actual physical execution tree. In this way, access-path-selection rules are made configuration-independent, and potential execution sub-plans are not missed. The APR physical operator contains the relevant information about the logical operator tree that triggered the implementation rule. Specifically, store in the APR node the tuple (S,O,A,N), where S is the set of columns in sargable predicates and the predicate cardinalities, O is the sequence of columns for which an order has been requested, A is the set of additional columns used upwards in the execution plan, and N is the number of times the sub-plan would be executed (N is greater than one only if the sub-plan is the right-hand-side of an index-nested-loop join). The information in APR nodes encodes the properties that any physical execution sub-plan must satisfy in order to implement the logical operator tree that triggered the corresponding implementation rule.

Consider as an example the query: $\Pi_{R.c,S.b}(\sigma_{R.a=5}(R) \triangleright \triangleleft_{R.x=S.y} S)$.

Figure 7:
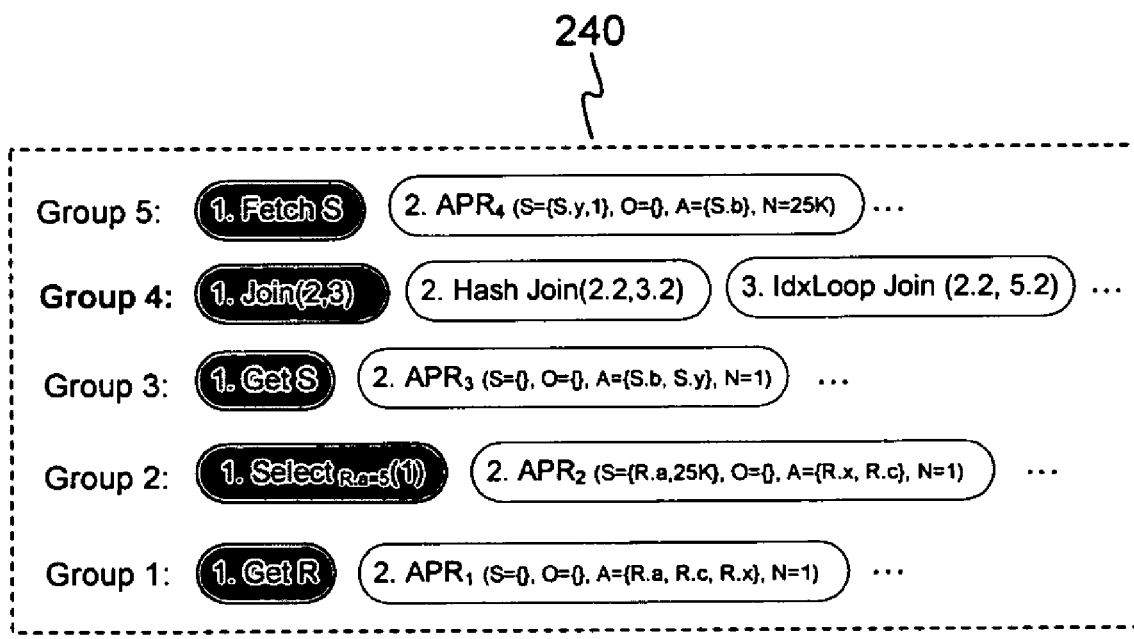
FIG. 7 shows a partial MEMO when optimizing a query.

FIG. 7 shows a partial MEMO 240 when optimizing the above query. There are four APR nodes resulting from different implementation rules. As an example, $APR_2$ was generated by the rule that implements index strategies for single-table selections. The information contained in this operator specifies that (i) there is one sargable column R.a returning 25,000 tuples, (ii) there is no order requested, (iii) the columns that are required are R.c and R.x, and (iv) the sub-plan would be executed once. Similarly, $APR_4$ in group 5 was generated as part of the implementation rule that transform joins with single-table right-hand-sides into index-loop joins. It specifies that S.y is a sargable column which would be sought with 25,000 bindings. Finally, APR, and $APR_3$ are generated as part of the rule that implements physical scans over tables.

Note that this mechanism results in the following two crucial properties. First, the leaf nodes in the MEMO are always APR physical operators. Second, there are no remaining rules in the optimizer that depend on the specific configuration, so the optimization of queries is truly configuration-independent. In the next section it is shown how to calculate the cost of an APR physical operator.

Relaxing the Search Space

The original Cascades formulation uses a variant of branch-and-bound pruning to avoid exploring alternatives that are guaranteed to be sub-optimal. Specifically, line 07 in pseudocode 200 (FIG. 5) completely discards a groupExpression—without even optimizing its children—if it costs more than a previously found alternative. While this pruning makes sense in a traditional optimizer, it might be a problem to apply it for C-PQO since the ultimate cost of an expression in fact depends on the actual configuration, and therefore aggressive pruning would result in potential loss of optimal plans for some valid configurations. A solution for this problem would be to remove the pruning altogether (i.e., remove line 07 from pseudocode 200. While this approach is correct, it might result in longer optimization calls. Instead, is next shown how to improve this simple approach by eliminating all the candidates that cannot be part of any solution under any configuration. At the same time, it is shown how to calculate the cost of an APR physical operator.

Extending the Cost Model

One of the difficulties of handling APR physical operators is that they are really a specification of the properties that any sub-execution plan should satisfy in order to be a valid alternative. Therefore, it is difficult to form a precise notion of the cost of an APR (if one can be formed at all) because it depends on the actual configuration. However, there are bounds on the cost of such APR. On one hand, there exists a configuration with the correct indexes that make a given APR execute as fast as possible. Conversely, the configuration that contains no indexes is guaranteed to result in the worst possible implementation of any given APR. Therefore, instead of having a single cost for each physical operator in the tree, it is suggested to maintain two costs, denoted bestCost (which is the smallest possible cost of any plan implementing the operator tree under any configuration), and worstCost (which is the largest smallest possible cost of any execution plan over all configurations, and effectively is the smallest possible cost under the configuration that contains no indexes).

Values of bestCost and worstCost can be readily calculated for non-leaf nodes in the MEMO. In fact, the bestCost of an operator is the local cost of the operator plus the sum of the minimum bestCost of each children (worstCost values are calculated analogously). Next it is described how to obtain bestCost and worstCost for the leaf APR physical operators.

Consider an APR node with information (S,O,A,N) where each element in S contains a column, the predicate type (i.e., equality or inequality), and the cardinality of the predicate. Then, obtain the index-based execution plan that leads to the most efficient implementation of the logical sub-tree as follows:

1. Obtain the best "seek-index" $I_{seek}$ containing (i) all columns in S with equality predicates, (ii) the remaining columns in S in descending cardinality order, and (iii) the columns in (O∪A)−S.

2. Obtain the best "sort-index" $I_{sort}$ with (i) all columns in S with single equality predicates (they would not change the overall sort order), (ii) the columns in O, and (iii) the remaining columns in S ∪ A.

3. bestCost(APR) is defined as the minimum cost of the plan that implements APR with either $I_{seek}$ or $I_{sort}$ (see the "Leaf Node Calculation" section for a mechanism to calculate the cost of a plan that uses a given index to implement an APR operator).

Obtaining the value of worstCost for a given APR operator is less involved. It may be needed to evaluate the cost of implementing the APR operator with just a heap (i.e., without any index). The following lemma establishes the correctness of this approach.

LEMMA 1. Let α be a physical APR operator. The procedure above returns the minimum possible cost of any execution plan implementing CZ under any valid configuration and the largest cost of the optimal execution plan for CZ under any valid configuration.

As an example, consider an APR operator α with the following information: $[S=(a_{[eq,300]}, b_{[lt,200]}, c_{[gt,100]}), O=(d), A=(e), N=1]$. In this case, the value of bestCost is the minimum cost of the plan that uses either $I_{seek}=(a, c, b, d, e)$ or $I_{sort}=(a, d, b, c, e)$. Similarly, the value of worstCost is the cost of the plan that uses a heap to implement α.

Pruning the Search Space

With the ability to calculate bestCost and worstCost values for arbitrary physical operators in the MEMO structure, a relaxed pruning rule can be implemented as follows:

Relaxed pruning rule: Every time that the partial bestCost of a groupExpressions g is larger than the worstCost of a previous solution for the group under the same optimization context, eliminate g from consideration.

LEMMA 2. The relaxed pruning rule does not eliminate any execution plan that can be optimal for some valid configuration.

3.3 Putting it all Together

The modified version of the OptimizeGroup procedure of FIG. 5 is now shown with changes to support C-PQO. FIG. 8 shows pseudocode 260 of the new procedure, which is referred to as OptimizeGroup$_{C-PQO}$. This new procedure is described next and contrasted with the original version.

The first difference in OptimizeGroup$_{C-PQO}$ is the input/output signature. The new version does not accept an upper bound UB as input, since this is used in the original branch-and-bound pruning strategy, which is no longer relied on. Also, the output of the new procedure consists not of a single groupExpression but of the full set of groupExpressions for group G and required properties RP. The second difference in the new version is that the original winnerCircle structure is replaced with the more general alternativePool associative array, which returns the set of all valid groupExpressions for a given group and set of required properties.

For a given input group G and required properties RP, algorithm OptimizeGroup$_{C-PQO}$ first checks the alternativePool data structure for a previous call compatible with RP. If it finds one, it returns the set of groupExpressions previously found, effectively implementing memorization. Otherwise, line 04 iterates over all enumerated physical groupExpressions in G (note that this line encapsulates the changes to the rules that select access paths and now return APR operators). For each such root groupExpression candP, line 05 estimates the local values of bestCost and worstCost for candP (in case of APR operators, use the procedure discussed above ("Relaxing the Search Space"), while in the remaining cases both bestCost and worstCost values are equal to the original local cost of the operator). Then, line 08 calculates the input group and required properties for each input of candP and line 09 recursively calls OptimizeGroup$_{C-PQO}$ to optimize them.

After each input is successfully optimized, lines 11 and 12 store the set of candidates for each of candP's children in the array allChildren and update its partial values of bestCost and worstCost. Note that, if at any moment the current bestCost of candP becomes larger than the worstCost of a previously calculated solution, the candidate is discarded and the next one is considered (line 07). Otherwise, after candP is completely optimized, line 13 adds it to the candidate pool for the G and RP and line 14 updates the upper bound with the worstCost value of candP if applicable. After all candidates are explored, line 15 updates the alternativePool array and line 16 returns the set of candidate groupExpressions.

As can be seen, even though several changes may be made to enable C-PQO in a Cascades-based query optimizer, the main structure of the optimization tasks remain similarly structured.

The Output of a C-PQO Optimization

After executing OptimizeGroup$_{C-PQO}$ on the root node of the initial MEMO with the global set of required properties, the output of a C-PQO optimization is prepared by extracting an AND/OR subgraph of physical operators from the final MEMO. Each node in the output graph can be of one of two classes. On one hand, AND nodes contain the actual physical groupExpressions along with their bestCost and localCost values (the localCost value is the one defined in line 05 of pseudocode 260 and can be obtained back by subtracting the bestCost values of the best children of a groupExpression from its own bestCost value). Each outgoing edge of an AND node represents a child of the corresponding groupExpression and goes into an OR node. OR nodes, in turn, correspond to candidate choices, represented by outgoing edges into other AND nodes. Additionally, each OR node distinguishes, among its choices, the one that resulted in the minimum bestCost value (i.e., the child that contributed to candP.bestCost in line 12 of pseudocode 260). Finally, a root OR node is added that has outgoing edges towards every AND node that corresponds to a groupExpression in the root node of the final MEMO satisfying the original required properties (since there might be many alternatives to implement the query, this root OR node represents the highest-level choice).

Figure 9:
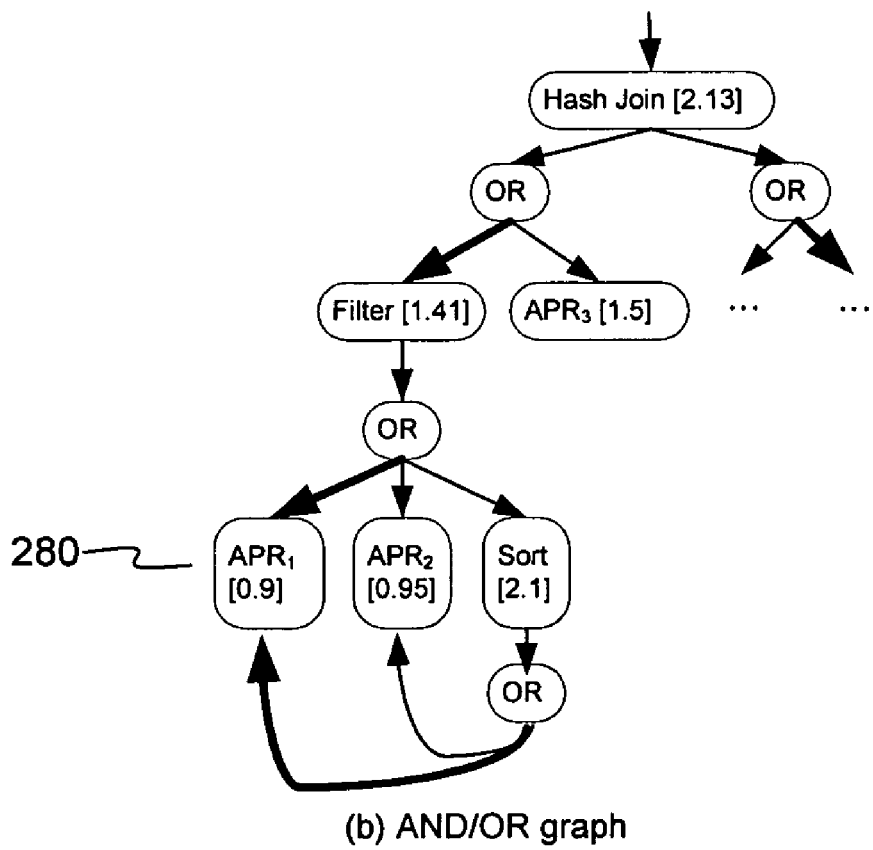
FIG. 9 shows a sample AND/OR graph induced from a partial MEMO structure.

FIG. 9 shows a sample AND/OR graph 280 induced by a partial MEMO structure 282. The notation 7.{1, 2, 3} in the physical operators refers to the set of groupExpressions {7.1, 7.2, 7.3}, and the best alternative for an OR node is shown with a bold arrow). Hereafter, $MEMO_{C\text{-}PQO}$ will be denoted to the AND/OR graph induced by the final MEMO in a C-PQO optimizer.

Fast Reoptimization in C-PQO

The $MEMO_{C\text{-}PQO}$ described in the previous sections encapsulates optimization state that can be obtained without knowing a specific configuration instance. Additionally, it contains enough information to derive configuration-specific execution sub-plans. In this section it is described how to obtain an execution plan and the estimated cost for a query given its $MEMO_{C\text{-}PQO}$ under an arbitrary configuration. The "Initialization" section describes a one-time post-processing pass on the $MEMO_{C\text{-}PQO}$ that simplifies subsequent re-optimizations. The "Leaf Node Calculation" section describes how to deal with leaf APR nodes. The "Overall Cost Calculation" describes the re-optimization algorithm. Finally, the "Extensions" section discusses extensions to the basic approach.

Initialization

Before the first re-optimization, some transformations are performed in the $MEMO_{C\text{-}PQO}$ to reduce subsequent work. Since APR nodes are produced by modified implementation rules, there might be several instances of such rules that produce APR nodes that are indistinguishable. Since the techniques may do some work for each APR in the $MEMO_{C\text{-}PQO}$ on a re-optimization, identical APR nodes are collapsed into a single representative by using a hash table of APR nodes. Since the final number of distinct APR nodes is fairly small, this step is efficient. Additionally, a quick consolidation of OR nodes is performed in the $MEMO_{C\text{-}PQO}$. Recall that OR nodes represent a subset of choices in a given group. Each OR node is therefore analyze to collapse those that are defined on the same group and agree on all the alternatives. Since group ids are consecutive integers, this can be done efficiently by using an array indexed by the OR node group id. Comparing whether two OR nodes are identical is also efficient, because the $MEMO_{C\text{-}PQO}$ returns groupExpressions in the OR node sorted by groupExpression id, and therefore the set-comparison can be done in linear time. Finally, perform a bottom-up traversal of the resulting graph and eliminate OR nodes that have no AND children (e.g., because there were no successful implementations during optimization due to contradictory required properties), and all AND nodes for which there is at least one child for which the corresponding OR node has been eliminated.

Leaf Node Calculation

Figure 10:
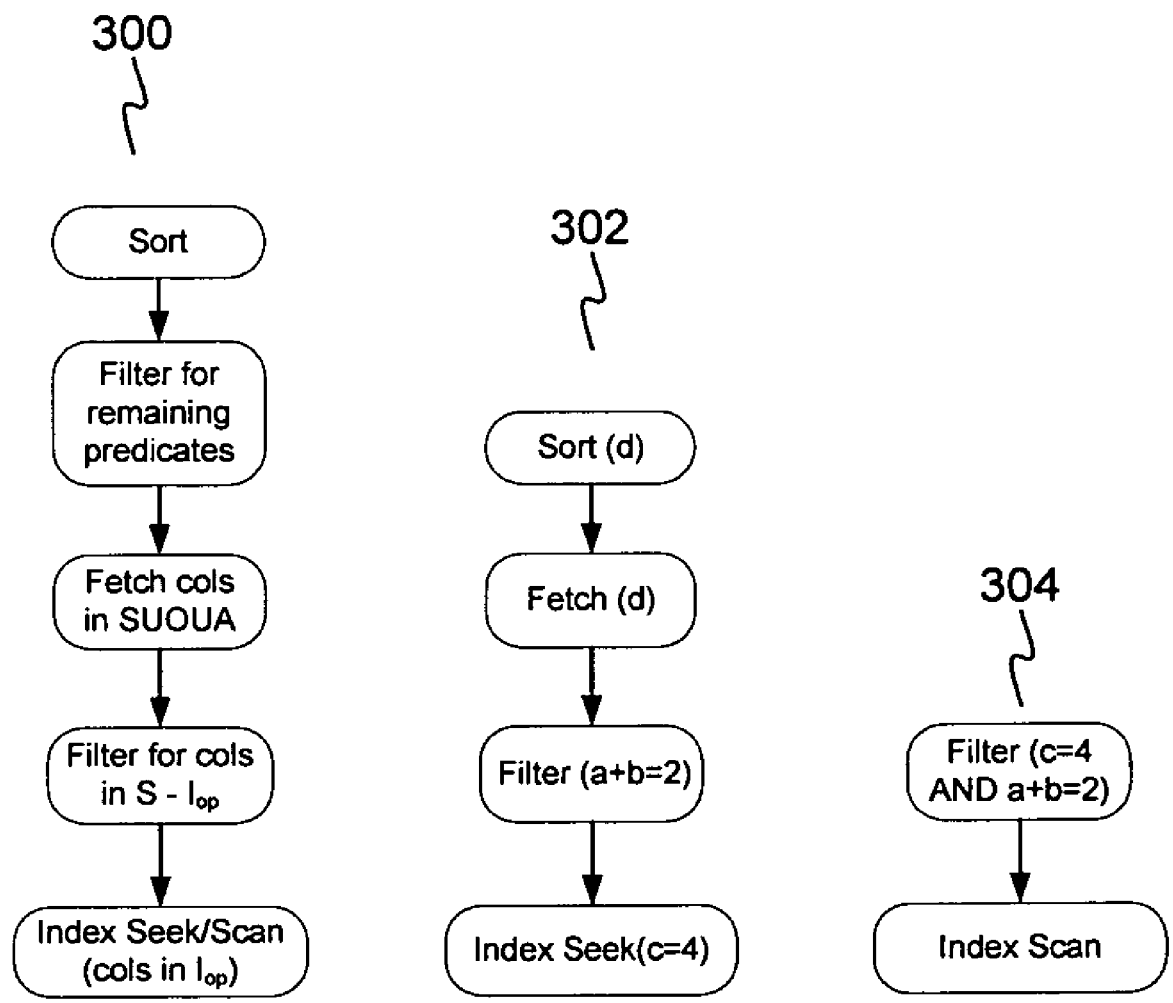
FIG. 10 shows several plan patterns, including a generic pattern 300 for single-index execution plans that implements this logical tree.

Another technique is the ability to calculate the cost of the best plan for a physical APR operator for a given input configuration. Consider a physical APR operator $\alpha=(S,O,A,N)$ and calculating the cost of an alternative sub-plan that uses an index I over columns $(c_1, \ldots, c_n)$ to implement $\alpha$. In order to do so, simulate the implementation rules that produced $\alpha$ in the first place, and approximate what the optimizer would have obtained under the hypothetical configuration that contains index I. Let I be the longest prefix $(c_1, \ldots, C_k)$ that appears in S with an equality predicate, optionally followed by $c_{k+1}$ if $c_{k+1}$ appears in S with an inequality predicate. It is possible to implement $\alpha$ by (i) seeking I with the predicates associated with columns in I, (ii) filtering the remaining predicates in S that can be answered with all columns in I, (iii) looking up a primary index to retrieve missing columns in $\{c_1, \ldots c_n\}$-S-O-A, (iv) filtering the remaining predicates in S, and (v) optionally sorting the result if O is not satisfied by the index strategy. FIG. 10 shows several plan patterns, including a generic pattern 300 for single-index execution plans that implements this logical tree.

As a simple example, consider a single-table logical operator tree representing the query $\Pi_A(\sigma_{a+b=2^{\wedge}c=4}(R))$ and the associated APR operator $\alpha=(S=\{c\},O=\{d\}, A=\{a, b, d\},N=1)$ (note that there is a sort requirement of column d). FIG. 10 shows a resulting physical tree 302 for an index $I_1=(c, a, b)$ (this execution plan seeks on $I_1$ for tuples satisfying c=4, filters tuples satisfying a+b=2, fetches the remaining columns and performs a final sort to satisfy the required order). Analogously, FIG. 10 also shows an execution plan 304 for the same logical operator tree and index $I_2=(d, c, b, a)$ (this execution plan scans the covering index $I_2$ and filters on the fly all the predicates, but does not explicitly sorts the output since it is already ordered in the right way).

Multiple Indexes

A configuration generally contains multiple indexes defined over the table of a given request. In principle, more than one index can be used to obtain a physical sub-plan that implements a request (e.g., by using index intersections). However, advanced index strategies might not be preferable since they might increase the complexity with generally modest gains in quality. However, note that this is just a matter of convenience, and exactly the same principles can be used to incorporate these less common strategies. Therefore, calculate the ideal execution plan for a given APR node as the minimum cost alternative for each of the indexes in the configuration defined over the same table as $\alpha$.

Overall Cost Calculation

Presented next is the overall algorithm to re-optimize a query under an arbitrary configuration. For a given configuration C and $MEMO_{C\text{-}PQO}$ M, function bestCostForC(root (M), C) returns the cost of the best execution plan for the query represented by M under configuration C. A functional specification of the algorithm is as follows:

```
bestCostForC(Node n, Configuration C) =
switch(n)
  case AND(APR_i, { }):
    return leafNodeCalculation(APR_i, C) (see "Leaf Node Calculation" sec.)
  case AND(op, {g_1, g_2, ... g_n}):
    return localCost(op) + Σ_i bestCostForC(g_i, C)
  case OR({g_1, g_2, ... g_n}):
    return min_i bestCostForC(g_i, C)
```

The function above operates depending on the type of input node n. If n is a leaf node (i.e., an APR node), then estimate the cost of the best configuration as explained in the "Leaf Node Calculation" section. Otherwise, if it is an internal AND node, then calculate the best cost by adding to the localCost of the groupExpression in n the sum of the best costs of each of n's children (calculated recursively). Finally, if n is an OR node, the minimum cost among the choices is returned.

Additional Details

In addition to the straightforward implementation of this functional specification, the following optimizations can also be performed.

Memorization: Note that the same node can be a child of multiple parents. To avoid unnecessary recomputation, memorization is used and therefore intermediate results are cached in order to operate over each node at most once.

Branch-and-Bound pruning: bestCostForC induces a depth-first search strategy; maintain the cost of the best solution found so far for each node in the $MEMO_{C\text{-}PQO}$ and discard alternatives that are guaranteed to be sub-optimal.

Execution plans: In addition to calculating the best cost for each node, also return the operator tree that is associated with such a cost. Therefore, the same algorithm returns both the best execution plan and its estimated cost.

Extensions

Discussed next are some extensions to the techniques described herein that take into account factors such as query updates and materialized views.

Update Queries

To this point SELECT-only workloads have been discussed. In reality, most workloads consist of a mixture of "select" and "update" queries, and C-PQO must take into consideration both classes to be useful. The main impact of an update query is that some (or all) indexes defined over the updated table must also be updated as a side effect. To address updates, modify the configuration-dependant implementation rules that deal with updates, and replace them with (non-leaf) UAPR nodes that encode the relevant update information. At re-optimization time, calculate the cost of updating all relevant indexes in the configuration for each UAPR node.

Materialized Views

Although indexes are the most widely used redundant data structure to speed-up query execution, materialized views are also a valuable alternative. Similar to the access-path-selection implementation rules described in the "Rule Set" section, query optimizers rely on view matching related rules that, once triggered within the context of a groupExpression, return zero or more equivalent rewritings of such groupExpression using an available view in the system. To incorporate materialized views into a C-PQO optimizer, it may be helpful to instrument such rules in a similar manner as in the case of indexes. Specifically, every time a view-matching rule is triggered, analyze the expression and return a VAPR node that encodes the logical operator-subtree. These view APRs are more complex than regular APRs, due to the need to encode the view expression itself, which might contain joins, grouping clauses and computed columns. However, the idea is still the same, and at the end of query optimization a $MEMO_{C\text{-}PQO}$ is returned that contains both APRs and VAPRs. A subtle complication of dealing with materialized views is that the optimizer might trigger index-based implementation rules over the newly used materialized views. In such situation, APRs are defined over VAPRs rather than base tables, but the underlying principles remain the same.

C-PQO Based Tuning Tools

Figure 11:
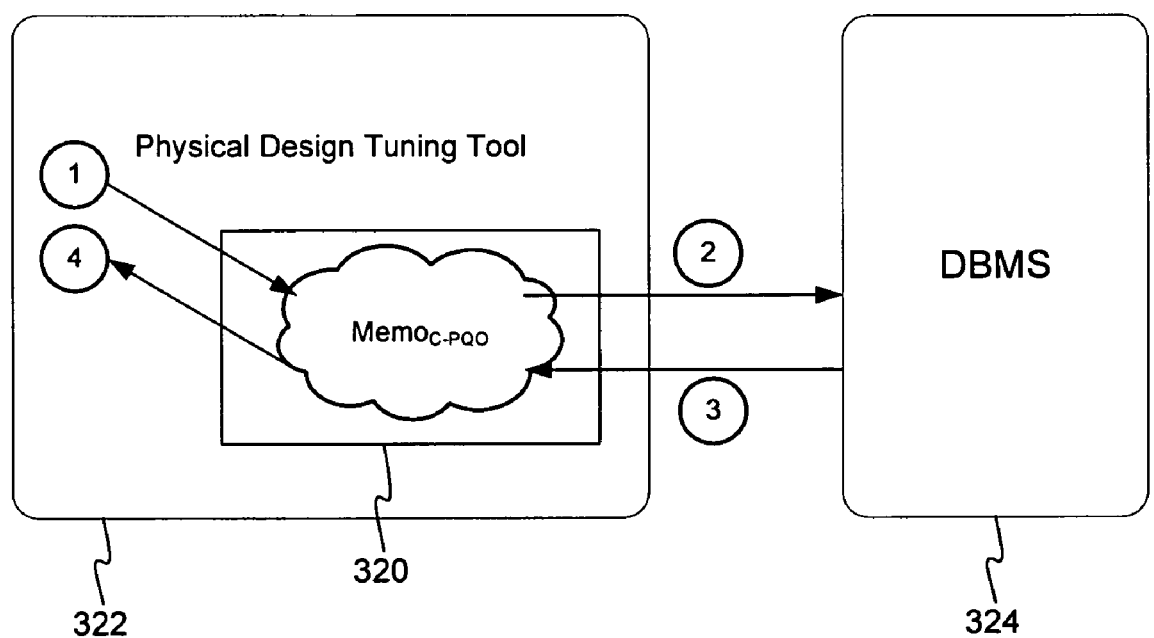
FIG. 11 shows a generic architecture to integrate C-PQO 320 into a design tool 322.

As explained before, current physical design tuning tools traverse the search space by repeatedly optimizing queries under different candidate configurations. It turns out that integrating C-PQO into a physical design tool is straightforward. FIG. 11 shows a generic architecture to integrate C-PQO 320 into a design tool 322. A C-PQO component intercepts each optimization request (C,Q) for query Q and configuration C issued by the tuning tool (step 1 in FIG. 11). If Q has not been seen before, the C-PQO component issues a unique C-PQO call to DBMS 324 (step 2), obtaining back a $MEMO_{C\text{-}PQO}$ (step 3). Then, it calculates the execution plan and cost for Q using the $MEMO_{C\text{-}PQO}$ as described above (specifically, the sections under "Fast Re-Optimization in C-PQO") and returns the result to the caller (step 4). The $MEMO_{C\text{-}PQO}$ is cached locally so that future calls with the same query are served without going back to the DBMS 324. In this way, the tuning tool 322 is not aware that the optimization calls are actually being served by a C-PQO component, and proceeds without changes regarding its search strategy.

Deeper Integration with Tuning Tools

Although the architecture described above can dramatically boost the execution times of tuning tools, there might be additional opportunities to leverage C-PQO for physical design tuning. Consider for instance re-optimizing a multi-query workload. If the workload queries share some structure, rather that operating over each individual $MEMO_{C\text{-}PQO}$ structure for the workload queries, it is possible to create a combined $MEMO_{C\text{-}PQO}$ based on the individual query $MEMO_{C\text{-}PQO}$ structures by simply adding a new AND root node. Additionally, collapse identical sub-graphs into a single representative, obtaining a compressed representation that would be re-optimized much faster. Furthermore, suppose if it is desirable to reoptimize a query under a configuration $C_{new}$ that is slightly different from a previously optimized configuration $C_{old}$. Reuse the $MEMO_{C\text{-}PQO}$ computation for $C_{old}$ by (i) recalculating all APR leaf nodes that can be influenced by the differences between $C_{old}$ and $C_{new}$ (e.g., APRs over tables that have the same indexes in both $C_{new}$ and $C_{old}$ do not need to be recalculated), and (ii) recalculating bottom-up the cost and plans based on the (small) number of changes in the APR leaf nodes.

CONCLUSION

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and featured can be performed on any type of computing device, including portable devices, workstations, servers, mobile wireless devices, and so on.

The invention claimed is:

1. One or more computer readable storage media storing information to enable a computing device to perform a process to facilitate physical design tuning of a database comprised of tables and indices thereof, wherein the database is managed by a database management system (DBMS), the DBMS configured to optimize execution plans for queries, the database having a set of indices, wherein if the database is reconfigured by adding, removing, or reconfiguring an index for a table of the database, an execution plan optimized by the DBMS for an arbitrary query before the reconfiguration of the database will differ from an execution plan for the arbitrary query optimized by the DBMS after the database is reconfigured, the process comprising:

receiving at the DBMS, from a client, a query and a first candidate configuration, the first candidate configuration comprising a first hypothetical index change for the database, the first hypothetical index change comprising information representing a first addition, removal, or modification of an index of the database;

while performing optimization of the query, by the DBMS, according to the first candidate configuration, producing a first execution plan, the producing including identifying parts of the first execution plan as being independent of the first hypothetical index change and storing dependency information indicating the identified parts, wherein the DBMS stores the first execution plan of the query and the dependency information and does not execute the query; and receiving at the DBMS, from the client, a second candidate configuration different than the first candidate configuration and describing a second hypothetical index change comprising information representing a second addition, removal, or modification of an index of the database, and using the stored first execution plan and the dependency information to perform optimization of the query according to the second candidate configuration by, according to the dependency information, using the parts of the stored first execution plan identified by the dependency information to build a second execution plan that includes the indentified parts of the first execution plan and includes second parts that are dependent on the second hypothetical index change.

2. One or more computer readable storage media according to claim 1, wherein the DBMS comprises a Cascades-based optimizer that performs memoization.

3. One or more computer readable storage media according to claim 1, wherein the client determines whether the query has been previously issued and when it has not the client requests that information about the first MEMO data structure execution plan be returned to the client.

4. One or more computer readable storage media according to claim 3, wherein the client uses the returned first execution plan to optimize a workload.

5. One or more computer readable storage media according to claim 1, wherein the first execution plan comprises a MEMO data structure that is capable of representing other execution plans that are possible for the query for varying candidate configurations.

6. One or more computer readable stgorage media according to claim 1, the process further comprising producing a second execution plan for the second candidate configuration that uses at least a portion of the first execution plan generated by the optimizing the query according to the first candidate configuration.

* * * * *